US012579602B2

(12) United States Patent
Sha et al.

(10) Patent No.: US 12,579,602 B2
(45) Date of Patent: Mar. 17, 2026

(54) END-TO-END CAMERA CALIBRATION FOR BROADCAST VIDEO

(71) Applicant: Stats LLC, Chicago, IL (US)

(72) Inventors: Long Sha, Brisbane (AU); Sujoy Ganguly, Chicago, IL (US); Patrick Joseph Lucey, Chicago, IL (US)

(73) Assignee: Stats LLC, Chicago, IL (US)

( * ) Notice: Subject to any disclaimer, the term of this patent is extended or adjusted under 35 U.S.C. 154(b) by 0 days.

(21) Appl. No.: 18/513,966

(22) Filed: Nov. 20, 2023

(65) Prior Publication Data

US 2024/0095874 A1 Mar. 21, 2024

Related U.S. Application Data

(63) Continuation of application No. 17/226,205, filed on Apr. 9, 2021, now Pat. No. 11,861,806.

(Continued)

(51) Int. Cl.
*G06T 3/00* (2024.01)
*G06N 3/08* (2023.01)
(Continued)

(52) U.S. Cl.
CPC ................. *G06T 3/00* (2013.01); *G06N 3/08* (2013.01); *G06T 3/18* (2024.01); *G06T 7/11* (2017.01);
(Continued)

(58) Field of Classification Search
None
See application file for complete search history.

(56) References Cited

U.S. PATENT DOCUMENTS

| 2013/0063549 A1 | 3/2013 | Schnyder et al. |
| 2017/0255828 A1 | 9/2017 | Chang et al. |
| | (Continued) | |

FOREIGN PATENT DOCUMENTS

| CN | 110782483 A | 2/2020 |
| CN | 110798673 A | 2/2020 |
| | (Continued) | |

OTHER PUBLICATIONS

Homayounfar, Namdar, Sanja Fidler, and Raquel Urtasun. "Soccer field localization from a single image." arXiv preprint arXiv: 1604.02715 (2016). (Year: 2016).*

(Continued)

*Primary Examiner* — Vincent Rudolph
*Assistant Examiner* — Meredith Taylor
(74) *Attorney, Agent, or Firm* — Bookoff McAndrews, PLLC

(57) ABSTRACT

A system and method of calibrating a broadcast video feed are disclosed herein. A computing system retrieves a plurality of broadcast video feeds that include a plurality of video frames. The computing system generates a trained neural network, by generating a plurality of training data sets based on the broadcast video feed and learning, by the neural network, to generate a homography matrix for each frame of the plurality of frames. The computing system receives a target broadcast video feed for a target sporting event. The computing system partitions the target broadcast video feed into a plurality of target frames. The computing system generates for each target frame in the plurality of target frames, via the neural network, a target homography matrix. The computing system calibrates the target broadcast video feed by warping each target frame by a respective target homography matrix.

20 Claims, 7 Drawing Sheets

Related U.S. Application Data

(60) Provisional application No. 63/008,184, filed on Apr. 10, 2020.

(51) Int. Cl.

| | |
|---|---|
| *G06T 3/18* | (2024.01) |
| *G06T 7/11* | (2017.01) |
| *G06T 7/80* | (2017.01) |
| *G06V 10/24* | (2022.01) |
| *G06V 10/82* | (2022.01) |
| *G06V 20/40* | (2022.01) |
| *G06V 30/19* | (2022.01) |

(52) U.S. Cl.

CPC .............. *G06T 7/80* (2017.01); *G06V 10/24* (2022.01); *G06V 10/82* (2022.01); *G06V 20/49* (2022.01); *G06V 30/19173* (2022.01); *G06T 2207/10016* (2013.01); *G06T 2207/20081* (2013.01); *G06T 2207/20084* (2013.01); *G06T 2207/30244* (2013.01)

(56) References Cited

U.S. PATENT DOCUMENTS

| | | | |
|---|---|---|---|
| 2018/0336704 A1* | 11/2018 | Javan Roshtkhari | ..... G06T 7/80 |
| 2019/0034739 A1 | 1/2019 | Stein et al. | |
| 2019/0087661 A1 | 3/2019 | Lee et al. | |
| 2019/0147341 A1 | 5/2019 | Rabinovich et al. | |

| | | | |
|---|---|---|---|
| 2020/0074682 A1 | 3/2020 | Sunkavalli et al. | |
| 2020/0279398 A1* | 9/2020 | Sha | ........................... G06T 7/80 |
| 2020/0372679 A1 | 11/2020 | Roshtkhari et al. | |

FOREIGN PATENT DOCUMENTS

| | | |
|---|---|---|
| WO | 2010127418 A1 | 11/2010 |
| WO | 2020176872 A1 | 9/2020 |

OTHER PUBLICATIONS

Homayounfar, Namdar, Sanja Fidler, and Raquel Urtasun. "Sports field localization via deep structured models." Proceedings of the IEEE Conference on Computer Vision and Pattern Recognition. 2017. (Year: 2017).*

Homayounfar Namdar et al: "Sports Field Localization via Deep Structured Models",2017 IEEE Conference on Computer Vision and Pattern Recognition (CVPR), IEEE Computer Society, US, Jul. 21, 2017, pp. 4012-4020, XP033249753, ISSN: 103-6919, DOI: 10.1109/CVPR.2017.427.

PCT International Application No. PCT/US2021/026517, International Search Report and Written Opinion of the International Searching Authority, dated Jul. 16, 2021, 12 pages.

Chen, J. et al., "Sports Camera Calibration via Synthetic Data", 2019 IEEE/CVF Conference on Computer Vision and Pattern Recognition Workshops (CVPRW), IEEE, Jun. 16, 2019, pp. 2497-2504, XP033747032.

Detone, D. et al., "Deep Image Homography Estimation", Jun. 1, 2016, total 5 pages, XP093261713, Retrieved from the Internet: URL:https://www.researchgate.net/publication/305881252_Deep_Image_Homography_Estimation.

* cited by examiner

400

500

1

END-TO-END CAMERA CALIBRATION FOR BROADCAST VIDEO

CROSS-REFERENCE TO RELATED APPLICATIONS

This application is a continuation of, and claims the benefit of priority to, pending U.S. application Ser. No. 17/226,205, filed on Apr. 9, 2021, which claims the benefit of priority to U.S. Provisional Application Ser. No. 63/008, 184, filed Apr. 10, 2020, all of which are hereby incorporated by reference in their entireties.

FIELD OF THE DISCLOSURE

The present disclosure generally relates to system and method for end-to-end camera calibration for broadcast video actions and actors, based on, for example, tracking data.

BACKGROUND

The increasing number of vision-based tracking systems deployed in production have necessitated fast, robust camera calibration. In the domain of sport, for example, the majority of current work focuses on sports where lines and intersections are easy to extract, and appearance is relatively consistent across venues.

SUMMARY

In some embodiments, a method of calibrating a broadcast video feed is disclosed herein. A computing system retrieves a plurality of broadcast video feeds for a plurality of sporting events. Each broadcast video feed includes a plurality of video frames. The computing system generates a trained neural network, by generating a plurality of training data sets based on the broadcast video feed by partitioning the broadcast video feed into a plurality of frames and learning, by the neural network, to generate a homography matrix for each frame of the plurality of frames. The computing system receives a target broadcast video feed for a target sporting event. The computing system partitions the target broadcast video feed into a plurality of target frames. The computing system generates for each target frame in the plurality of target frames, via the neural network, a target homography matrix. The computing system calibrates the target broadcast video feed by warping each target frame by a respective target homography matrix.

In some embodiments, a system is disclosed herein. The system includes a processor and a memory. The memory has programming instructions stored thereon, which, when executed by the processor, performs one or more operations. The one or more operations include retrieving a plurality of broadcast video feeds for a plurality of sporting event. Each broadcast video feed includes a plurality of video frames. The one or more operation further include generating a trained neural network, by generating a plurality of training data sets based on the broadcast video feed by partitioning the broadcast video feed into a plurality of frames and learning, by the neural network, to generate a homography matrix for each frame of the plurality of frames. the one or more operations further include receiving a target broadcast video feed for a target sporting event. The one or more operations further include partitioning the target broadcast video feed into a plurality of target frames. the one or more operations further include for each target frame in the plurality of target frames, generating, by the neural network, a target homography matrix. The one or more operations further include calibrating the target broadcast video feed by warping each target frame by a respective target homography matrix.

In some embodiments, a non-transitory computer readable medium is disclosed herein. The non-transitory computer readable medium includes one or more sequences of instructions that, when executed by one or more processors, causes a computing system to perform one or more operations. The computing system retrieves a plurality of broadcast video feeds for a plurality of sporting events. Each broadcast video feed includes a plurality of video frames. The computing system generates a trained neural network, by generating a plurality of training data sets based on the broadcast video feed by partitioning the broadcast video feed into a plurality of frames and learning, by the neural network, to generate a homography matrix for each frame of the plurality of frames. The computing system receives a target broadcast video feed for a target sporting event. The computing system partitions the target broadcast video feed into a plurality of target frames. The computing system generates for each target frame in the plurality of target frames, via the neural network, a target homography matrix. The computing system calibrates the target broadcast video feed by warping each target frame by a respective target homography matrix.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
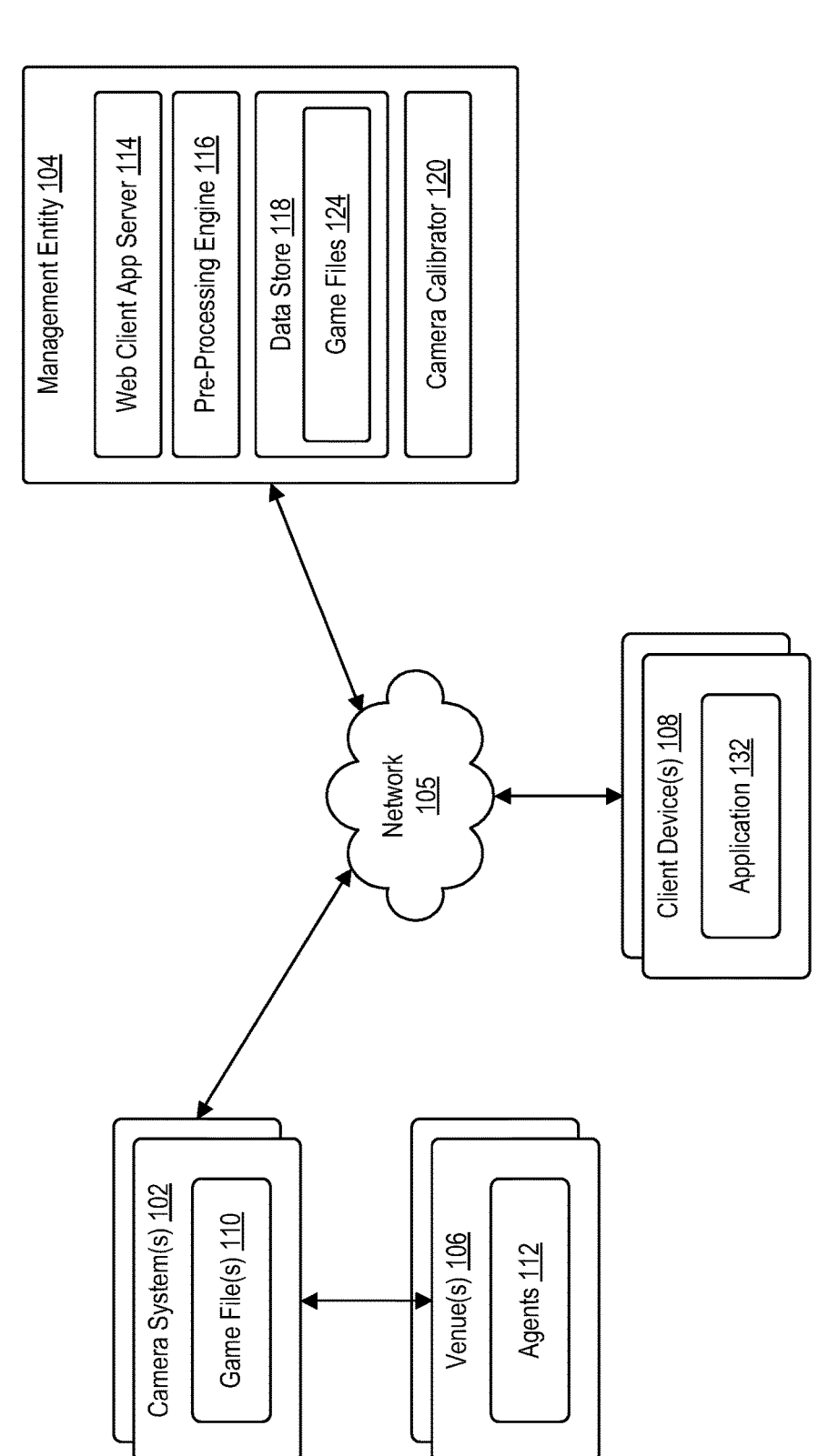
FIG. 1 is a block diagram illustrating a computing environment, according to example embodiments.

Camera calibration is an important task for computer vision applications, such as tracking systems, simultaneous localization and mapping (SLAM), and augmented reality (AR). Recently, many professional sports leagues have deployed some version of a vision-based tracking system. Additionally, AR applications (e.g., Virtual 3 in NBA®, First Down Line in NFL®) used during video broadcasts to enhance audience's engagement have become common-place. All of these applications require high-quality camera calibration systems. Presently, most of these applications rely on multiple pre-calibrated fixed cameras or the real-time feed of pan-tilt-zoom (PTZ) parameters directly from the camera. However, as the most widely available data source in the sports domain is broadcast videos, the ability to calibrate from a single, moving camera with unknown and changing camera parameters would greatly expand the reach of player tracking data and fan-engagement solutions. Cali-bration of a single moving camera remains a challenging task as the approach should be accurate, fast, and general-izable to a variety of views and appearances. The one or more techniques described herein allows for a computing system to determine camera homography of a single moving camera given the frame and the sport.

Current approaches to camera calibration mainly follow a framework based on field registration, template matching (i.e., camera pose initialization), and homography refine-ment. Most of these approaches focus on sports where semantic information (e.g., key court markings) is easy to extract, the field appearance is consistent across stadiums (e.g., green grass and white lines), and motion of the camera is relatively slow and smooth. These assumptions, however, do not hold in more dynamic sports, such as basketball, where players occlude field markings, the field appearance varies wildly from venue to venue, and the camera moves quickly.

Furthermore, most existing works consist of multiple standalone models that are trained or tuned separately. As a result, they cannot achieve a global optimal for such an optimization task. This issue further limits the performance of those methods in more challenging scenarios as error propagates through the system, module to module.

The one or more techniques described herein relate to a brand new end-to-end neural network used for camera calibration. Through use of the end-to-end neural network, the present system is able to handle more challenging scenarios involving motion blur, occlusion and large trans-formations—scenarios existing systems are simply unable to account for or address. In some embodiments, the present system implements area-based semantics rather than lines for camera calibration, thus providing a more robust approach for dynamic environments and those environments with highly variable appearance features. In some embodi-ments, the present system incorporates a spatial transforma-tion network for large transform learning, which aids in reducing the number of required templates for calibration purposes. In some embodiments, the present system imple-ments an end-to-end architecture for camera calibration, which allow for joint training and inference homography much more efficiently.

FIG. 1 is a block diagram illustrating a computing envi-ronment 100, according to example embodiments. Comput-ing environment 100 may include camera system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscat-ter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer network-ing arrangement used to exchange data or information. For example, network 105 may be the Internet, a private data network, virtual private network using a public network and/or other suitable connection(s) that enables components in computing environment 100 to send and receive infor-mation between the components of environment 100.

Camera system 102 may be positioned in a venue 106. For example, venue 106 may be configured to host a sporting event that includes one or more agents 112. Camera system 102 may be configured to capture the motions of all agents (i.e., players) on the playing surface, as well as one or more other objects of relevance (e.g., ball, referees, etc.). In some embodiments, camera system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects of relevance. As those skilled in the art recognize, utilization of such camera system (e.g., camera system 102) may result in many different camera views of the court (e.g., high sideline view, free-throw line view, huddle view, face-off view, end zone view, etc.). Generally, camera system 102 may be utilized for the broadcast feed of a given match. Each frame of the broadcast feed may be stored in a game file 110.

Camera system 102 may be configured to communicate with organization computing system 104 via network 105. Organization computing system 104 may be configured to manage and analyze the broadcast feed captured by camera system 102. Organization computing system 104 may include at least a web client application server 114, pre-processing engine 116, a data store 118, and a camera calibrator 120. Pre-processing engine 116 and camera cali-brator 120 may include one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instruc-tions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include the broad-cast data of a given match. For example, the broadcast data may be a plurality of video frames captured by camera system 102.

Camera calibrator 120 may be configured to calibrate the cameras of camera system 102. For example, camera calibrator 120 may be configured to project players detected in the trackable frames to real world coordinates for further analysis. Because cameras in camera systems 102 are constantly moving in order to focus on the ball or key plays, such cameras are unable to be pre-calibrated. Camera calibrator 120 may be configured to generate a homography matrix that can register a target ground-plane surface of any frame from the broadcast video with a top view field model. For example, camera calibrator 120 may implement a single neural network to find a homograph matrix H that can register the target ground-plane surface of any frame I from a broadcast video with a top view field model M. In some embodiments, the standard objective function for computing homography with point correspondence may be:

$$H = \arg\min_{H} \frac{1}{|\chi|} \sum_{(x'_i, x_i) \in \chi} |Hx'_i - x_i|_2$$

where $x_i$ represents the (x, y) location of pixel i in the broadcast image I and $x_i'$ is the corresponding pixel location on the model "image" M and $\chi$ represents a set of point correspondences between the two images I and M.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2A:
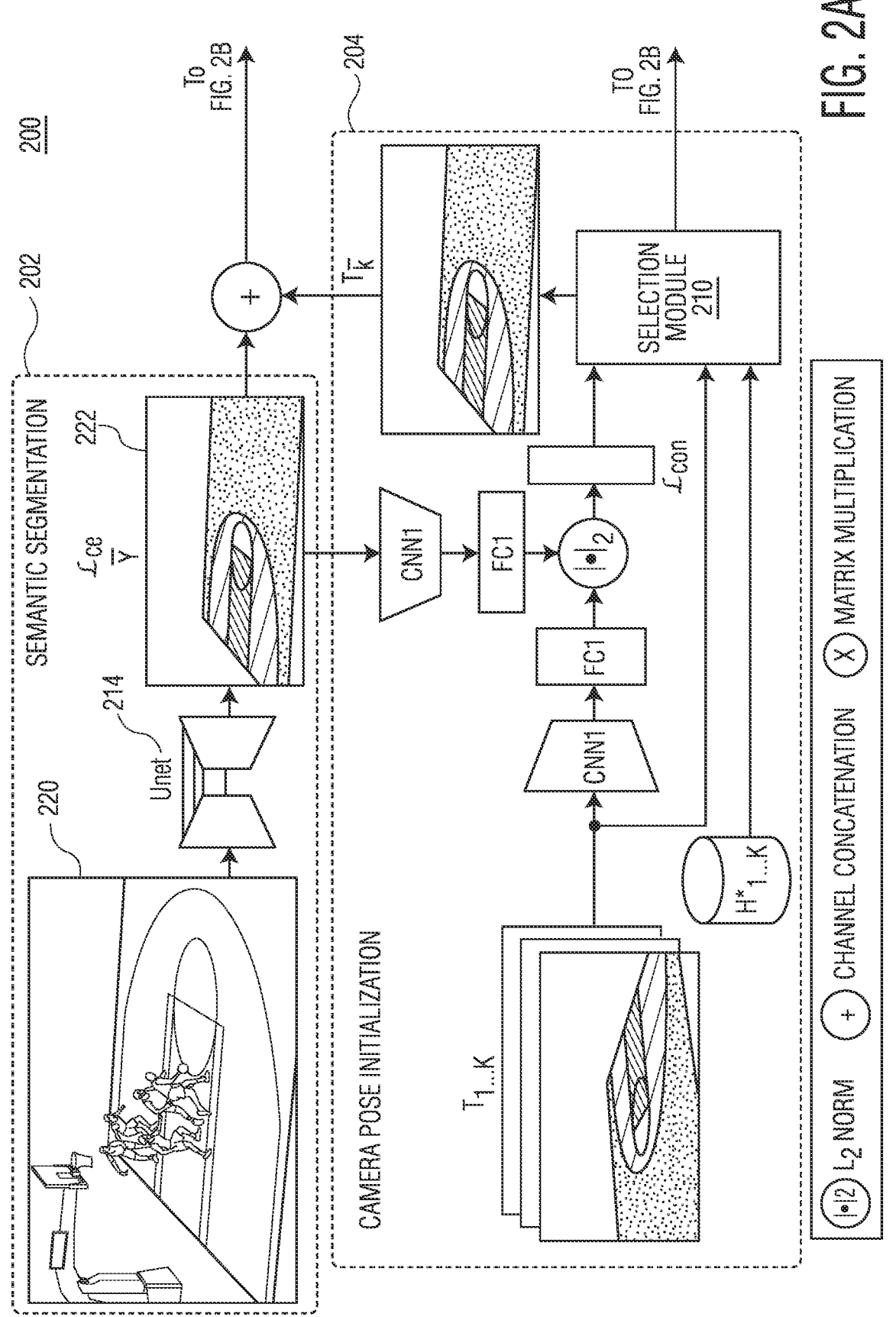
FIGS. 2A-2B are a block diagrams illustrating a neural network architecture of camera calibrator, according to example embodiments.
Figure 2B:
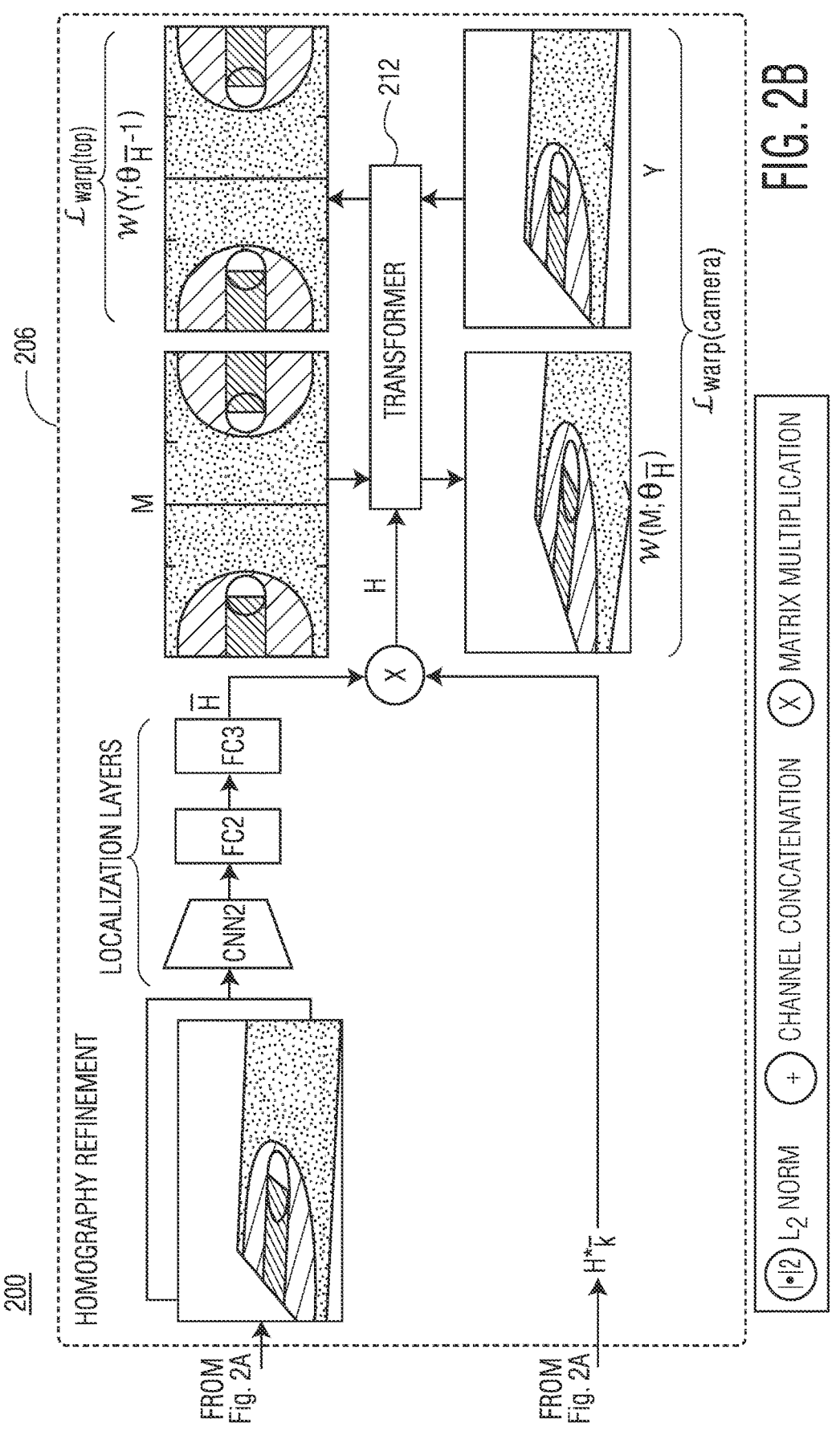

FIGS. 2A-2B are block diagrams illustrating neural network architecture 200 of camera calibrator 120, according to example embodiments. As discussed, camera calibrator 120 may utilize a single neural network, which takes in a video frame as input, and outputs a homography matrix of that frame. For example, camera calibrator 120 may utilize a single neural network for a single moving camera calibration given unknown camera internal parameters across a variety of sports (e.g., basketball, soccer, football, hockey, etc.). Neural network architecture 200 may include three modules: semantic segmentation module 202, camera pose initialization module 204, and homography refinement module 206. Each of the three modules 202-206 are integrated into a single neural network architecture, such as that shown by neural network architecture 200. Because all three module

202-206 are connected, neural network architecture 200 is capable of end-to-end training.

Semantic segmentation module 202 may be configured to identify features of the playing surface (e.g., basketball court, soccer field, etc.). For example, semantic segmentation module 202 may be configured to extract key features and remove irrelevant information from an input image, I (reference numeral 220). Such output may result in a venue agnostic appearance $\overline{Y}$ (reference numeral 222) that may be used to determine the point correspondences. Thus, the objective function H from above may be rewritten as:

$$\theta_H = \arg\min_{\theta_H} L\left(\overline{Y}, W(M; \theta_H)\right)$$

where $\theta_H$ represents a vector of the eight homography parameters, $W(; \theta)$ represents the warping function with transform parameters $\theta$, and $L()$ represents any loss function that measures the difference between two images, in this case the predicted semantic map $\overline{Y}$ and the warped overhead model M.

Semantic segmentation module 202 may conduct area-based segmentation on a playing surface by dividing the playing surface into one or more regions. By dividing the playing surface into one or more regions, semantic segmentation module 202 may transform the overhead field model M into a multi-channel image. Given the multi-channel image, semantic segmentation module 202 may classify each pixel in I into one region of the one or more regions. To generate area-based semantic labels of each image, semantic segmentation module 202 may warp the overhead model with the associated ground truth homography, thus providing ground truth semantic labels for training.

Figure 3:
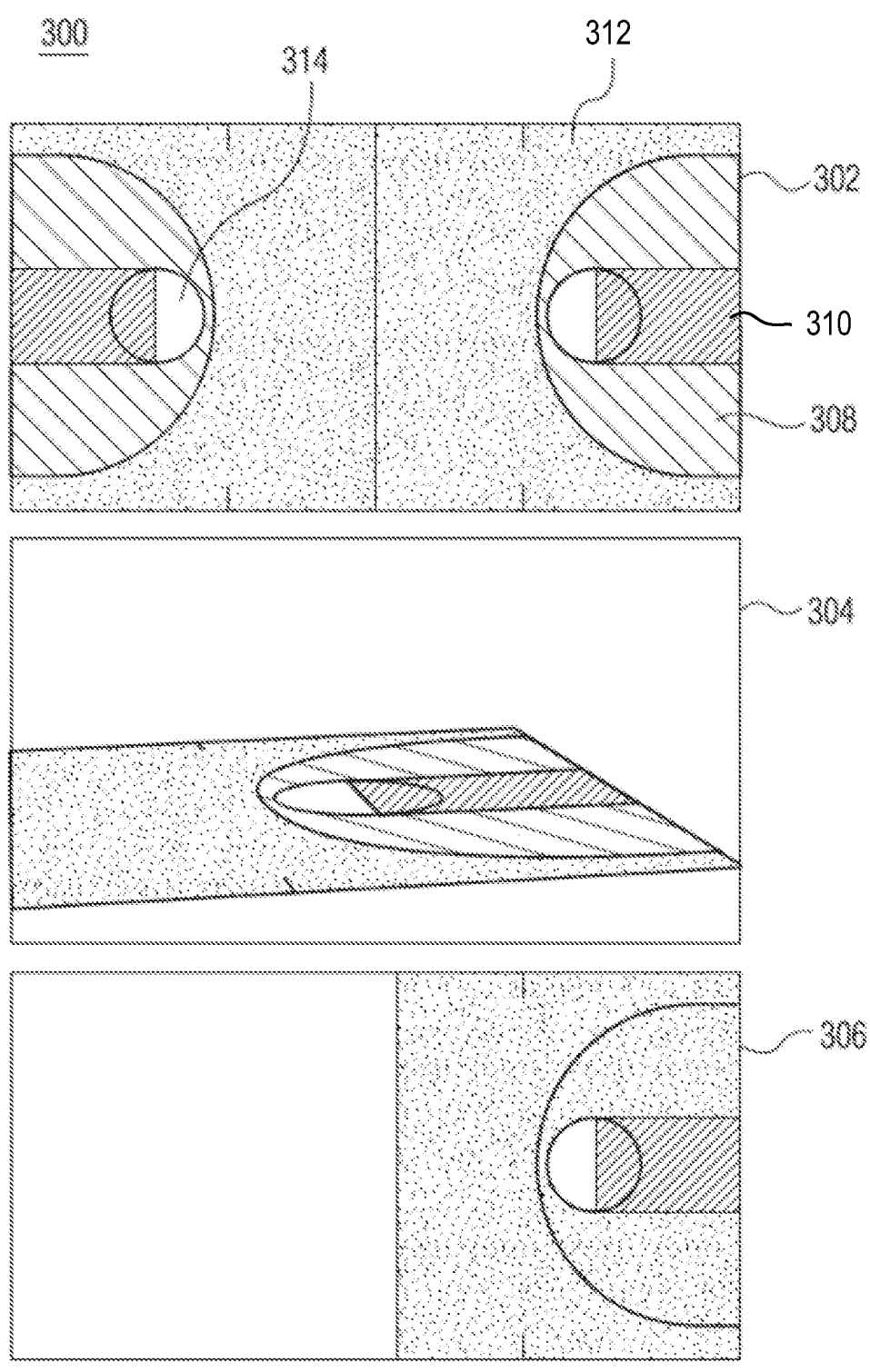
FIG. 3 is a block diagram illustrating one or more images of a playing surface, according to example embodiments.

FIG. 3 is a block diagram illustrating one or more images 302-306 of a basketball playing surface, according to example embodiments. As shown, image 302 may correspond to a top-down view field model for a basketball playing surface. Semantic segmentation module 202 may divide the basketball playing surface into four regions, resulting in a 4-chanel image. For example, region 308 may correspond to a first channel, region 310 correspond to a second channel, region 312 may correspond to a third channel, and region 314 may correspond to a fourth channel. In operation, semantic segmentation module 202 may utilize image 302 to classify each pixel in an input image (e.g., in I) into one of regions 308-314.

Image 304 may illustrate semantic labels applied to an incoming image. Semantic segmentation module 202 may generate image 304 by warping the field model M (e.g., image 302) using the ground truth homography. These images (e.g., image 302 and image 304) may then be used to train semantic segmentation module 202.

Image 306 may illustrate a polygonal area of image 304 from a top-down perspective, illustrating the fraction of the field model in the camera view.

Referring back to FIGS. 2A and 2B, for the segmentation task, semantic segmentation module 202 may implement a Unet style auto-encoder 214 (hereinafter "Unet 214"). Unet 214 may take, as input, image I 220 and output a semantic map $\overline{Y}$ 222 as needed by $\theta_{H'}$. In some embodiments, cross-entropy loss may be used to train Unet 214. For example:

$$\mathcal{L}_{ce} = -\frac{1}{|\overline{Y}||C|} \sum_{y_i^{-c} \in \overline{Y}} \sum_{c \in C} y_i^c \log y_i^{-c}$$

where C may represent the set of classes, and $y_i^c$ may represent the ground truth label, and $y_i^{-c}$ may represent the likelihood of pixel i belonging to class c.

Camera pose initialization module 204 may be configured to select an appropriate template from a set of templates using a semantic map. Camera pose initialization module 204 may use a Siamese network to determine the best template for each input semantic image. Siamese network may be a convolutional encoder that computes a hidden representation for a semantic image, which may be the output of Unet 214 or any semantic template image. In some embodiments, the similarity between two images may be the $L_2$ norm between their hidden representations. In some embodiments, each image may be encoded to a 128-length vector for similarity calculation. For a PTZ camera, the projective matrix P may be expressed as:

$$P=KR[I|-C]=KQS[I|-C]$$

where Q and S are decomposed from rotation matrix R, K are the intrinsic parameters of a camera in camera system 102, I is a 3×3 identity matrix, and C is the camera translation. The matrix S may describe the rotation from the world coordinate to the PTZ camera base, and Q represents the camera rotation due to pan and tilt. For example, S may be defined to rotate around world x-axis by about −90° so that the camera looks along the y-axis in the world plane. In other words, the camera is level and its projection is parallel to the ground.

In some embodiments, for each image, camera calibrator 120 may assume a center principle point, square pixels, and no lens distortion. In some embodiments, six parameters may be identified. For example, the six parameters may be the focal length, three-dimensional camera location, pan and tilt angles.

In some embodiments, pre-processing engine 116 may initialize intrinsic camera matrix K, camera location C, and rotation matrix R. With this initialization, pre-processing engine 116 may identify the optimal focal length, three-dimensional camera location, and rotation angles. For example, pre-processing engine 116 may use the Levenberg-Marquardt algorithm to find the optimal focal length, three-dimensional camera location, and rotation angles. Once pre-processing engine 116 determines K, C, R, and S, pre-processing engine 116 may generate Q. In some embodiments, pre-processing engine 116 may generate the pan and tilt angles given Q. For example, pre-processing engine 116 may generate the pan and tile angles by applied the Rodrigues formula to Q. Thus, from the above, camera pose initialization module 204 may generate the 6-dimensional camera configuration (pan, tilt, zoom, and three-dimensional camera location), λ.

After pre-processing engine 116 estimates the camera configuration λ for each training image, pre-processing engine 116 may generate a dictionary of possible camera poses Λ.

In some embodiments, pre-processing engine 116 may generate the dictionary of possible camera poses Λ by uniformly sampling from the range of possible camera poses. For example, pre-processing engine 116 may determine the ranges of pan, tilt, focal length, and camera location from training data and uniformly sample the poses from a 6-dimensional grid. Such method is able to cover all camera poses, even if the training set is small. Further, using a smaller grid may simplify the homography refinement since the maximum scale of the transformation needed is on the scale of the grid size.

In some embodiments, pre-processing engine 116 can learn the possible camera poses Λ directly from the training data using clustering. Such process may be beneficial, for example, when the training set has sufficient diversity. For example, pre-processing engine 116 may treat Λ as a multi-variant normal distribution and apply a Gaussian Mixture model (GMM) to build the camera pose set. In some embodiments, mixing weights π may be fixed as equal for each component. In some embodiments, covariance matrix Σ may be fixed for each distribution. In such embodiments, the characteristic scale of Σ may set the scale of the transformations that are handled by homography refinement module 206. In contrast with traditional GMMs, instead of setting the number of components K, the GMM learning algorithm implemented by pre-processing engine 116 may find the number of components K and the mean $\mu_k$ of each distribution given the mixing weights π and covariance matrix Σ. Identical Σ and π for each component may ensure that the GMM components are sampled uniformly from the manifold of the training data.

In some embodiments, the GMM learning algorithm may be:

---

Pre-define covariance Σ
for K = [100, 110, 120, . . . N] do
   Initialize $\mu_k$ for K GMM components
   while $\mu_k$ not converge do $$\text{Compute } \gamma_k(\lambda_n) = \frac{\pi_k \mathcal{N}\left(\lambda_n; \mu_k, \sum\right)}{\sum_j \pi_k \mathcal{N}\left(\lambda_n; \mu_k, \sum\right)}$$

$$\text{Update } \mu_k = \frac{\sum_n \gamma_k(\lambda_n)\lambda_n}{\sum_n \gamma_k(\lambda_n)}$$

end while $$\text{if } \frac{1}{N}\sum_n \max_k \frac{\mathcal{N}\left(\lambda_n; \mu_k, \sum\right)}{\mathcal{N}\left(\mu_k; \mu_k, \sum\right)} > \text{threshold then}$$

break
   end if
end for
Return GMM

---

Because pre-processing engine 116 may fix Σ, camera pose initialization module may only update μ during the maximization step. Pre-processing engine 116 may gradually increase K until the stopping criteria are satisfied. The stopping criteria may aim to generate enough components so that every training example is close to the mean of one component in the mixture. Pre-processing engine 116 may generate the camera pose dictionary Λ utilizing all components $[\mu_1, \ldots, \mu_k]$.

Given the dictionary of camera poses Λ, camera pose initialization module 204 may compute the homography for each pose and use the Λ to warp the overhead field model M. Accordingly, a set of image templates $\mathcal{T}=[T_1, \ldots, T_k]$ and their corresponding homography matrices $\mathcal{H}^*=[H_1^*, \ldots, H_K^*]$ may be determined and used camera pose initialization module 204.

Given the semantic segmentation image $\overline{Y}$ and a set of template images $\mathcal{T}$, camera pose initialization module 204 may use a Siamese network to computer the distance between each input and template pair $(\overline{Y}, T_k)$. In some embodiments, the target/label for each pair may be similar or dissimilar. For example, for a grid sampled camera pose dictionary, a template $T_k$ may be similar to the image if its pose parameters are the nearest neighbor in the grid. For the GMM-based camera pose dictionary, a template $T_k$ may be labeled as similar to an image if the corresponding distribution of the template $\mathcal{N}$ (; $\mu_k$, $\Sigma$) gives the highest likelihood to the pose parameters $\lambda$ of the input image. This procedure may generate a template similarity label for every image in the training set.

Once the input semantic image $\overline{Y}$ and the template images $\mathcal{T}$ are encoded (after FC1), camera pose initialization module 204 may use the latent representations to compute the L2 distance between the input image and each template. A selection module 210 may find the target camera pose index $\overline{k}$ and may retrieve its template image $T_{\overline{k}}$ and homography H $\overline{r}^*$ as output according to:

$$\overline{k} = \arg \min_k \left| f(\overline{Y}) - f(T_k) \right|_2$$

where $f(\ )$ may represent the encoding function of the Siamese network.

In some embodiments, camera pose initialization module 204 may use contrastive loss to train the Siamese network. For example, $$\mathcal{L}_{con} = \alpha |f(\overline{Y}) - f(T_k)|_2^2 + (1-\alpha)\max(0, m-|f(\overline{Y}) - f(T_k)|_2^2)$$

where $\alpha$ may represent the binary similarity label for the image pair ($\overline{Y}$, $T_k$) and m may represent the margin for contrastive loss.

Homography segmentation module 206 may be configured to refine the homography be identifying the relative transform between the selected template and the input image. For example, homography segmentation module 206 may implement a spatial transformer network (STN) that allows for the handling of large non-affine transformation and use of a smaller camera pose dictionary. For example, given the input image and a selected template, the two images may be stacked and provided as input to STN. STN may be used to regress the geometric transformation parameters. In some embodiments, residual blocks may be used in convolutional encoder to preserve the salient features for deformation prediction. In some embodiments, ReLU may be used for all hidden layers, while the output layer of STN may use a linear activation.

To compute the relative transform between input semantic image $\overline{Y}$ and the selected template image $T_{\overline{k}}$, homography segmentation module 206 may stack the images into an n-channel image (e.g., 8-channel image), forming the input to the localization layers of the STN. In some embodiments, the output of the localization layers may be the parameters (e.g., 8-parameters) of the relative homography $\overline{H}$ that maps the semantic image $\overline{Y}$ to the template $T_k$.

In some embodiments, homography segmentation module 206 may initialize the last of the localization layers (e.g., FC3), such that all elements in the kernel are zero and the bias is to the first n values (e.g., 8 values) of a flattened identity matrix. Therefore, at the start of the training, the input may be assumed to be identical to the template, providing an initialization for the STN optimization. Therefore, the final homography may be $H = H_{\overline{k}} * \overline{H}$.

Once H is computed, transformer 212 of homography refinement module 206 may warp the overhead model M to the camera perspective or vice versa, which allows camera calibrator 120 to compute the loss function. For example, homography refinement module 206 may us a Dice coefficient loss:

$$\text{Dice}(U, V) = \frac{1}{|C|} \sum_{c \in C} \frac{2\|U^c \circ V^c\|}{\|U^c\| + \|V^c\|}$$

where U, V may represent semantic images, C may represent the number of channels, $\circ$ may represent the element-wise multiplication, and $\|\cdot\|$ may represent the sum of pixel intensity in an image. Here, for example, the intensity of each channel may be the likelihood that the pixel belongs to a channel c. One of the major advantages of using area-based segmentation, as opposed to line-based segmentation, is that it is robust to occlusions and makes better use (i.e., more efficient use) of the network capacity because a larger fraction of image pixels may belong to a meaningful class.

A limitation, however, of intersection-of-union (IoU) based loss is that as the fraction of the field of view in the image decreases, the IoU loss may become sensitive to segmentation errors. For example, if the playing surface occupied a tiny portion of the image, a small transform could reduce the IoU dramatically. Therefore, homography refinement module 206 uses the Dice loss on the warped playing surface in both perspectives—a high occupancy perspective can achieve coarse registration, while a low occupancy perspective can provide strong constraints on fine-tuning. Thus, the loss functions may be defined as:

$$\mathcal{L}_{warp} = \delta\text{Dice}(Y, \mathcal{W}(M, \theta_H)) + (1-\delta)\text{Dice}(M', \mathcal{W}(Y, \theta_H^{-1}))$$

where Y may represent the ground truth semantic image and M' may represent the masked overhead field model so that loss is only computed for the area shown in the image. Losses from the two perspectives may be weighted by $\delta$, where the weight for the lower occupancy fraction perspective is always higher.

Because each module 202-206 may use the output of other modules as input, the three modules 202-206 may be connected into a single neural network (i.e., neural network architecture 200). As such, the total loss of the network may become:

$$\mathcal{W} = \alpha \mathcal{W}_{ce} + \beta \mathcal{W}_{con} + (1-\alpha-\beta) \mathcal{W}_{warp}$$

where $\alpha$, $\beta \in [0,1)$.

Camera calibrator 120 may train the entire neural network architecture 200 incrementally, module-by-module, so that the Siamese network and STN may start training with reasonable inputs. For example, training may start with a 20-epoch warm-up for the Unet; the Siamese network training may be turned on with a $\alpha=0.1$ and $\beta=0.9$. After another 10 epochs, for example, the STN may be turned on with $\alpha=0.05$ and $\beta=0.05$. Neural network architecture may continue to undergo join training until convergence.

Figure 4:
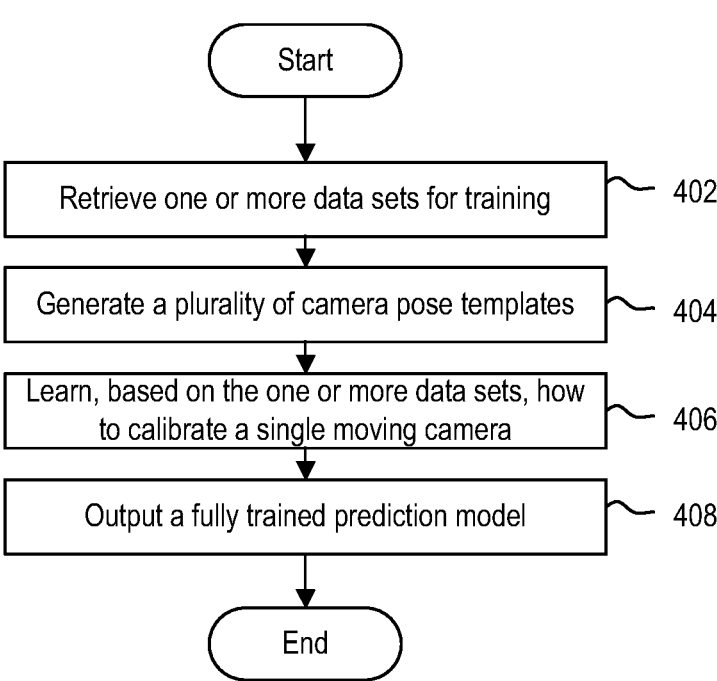
FIG. 4 is a flow diagram illustrating a method of generating a fully trained calibration model, according to example embodiments.

FIG. 4 is a flow diagram illustrating a method 400 of generating a fully trained calibration model, according to example embodiments. Method 400 may begin at step 402.

At step 402, organization computing system 104 may retrieve one or more data sets for training. Each data set may include a plurality of images captured by a camera system 102 during the course of a game.

In some embodiments, the data set may be created from thirteen basketball games. Those skilled in the art recognize that more than thirteen games or less than thirteen games may be used for training purposes. For example, ten games may be used for training and the remaining three games may be used for testing. Those killed in the art recognize that more than ten games or less than ten games may be used for training and more than three games or less than three games may be used for testing. The aforementioned number of games for training purposes is exemplary only and is not meant to limit the foregoing discussion. Different games may have different camera locations, with each game being played in a unique venue. As such, the playing surface appearance for each game may be very different from game-to-game. For each game, 30-60 frames may be selected for each annotation with a high camera pose diversity. Professional annotators may have clicked four to six point correspondences in each image to compute the ground truth homography. These annotations may have produced 526 images for training and 114 images for testing. In some embodiments, the training data may be further enriched by flipping the images horizontally, which may generate 1052 training examples in total.

In some embodiments, the data set may be created from twenty soccer games. For example, the twenty soccer games were held in nine different stadiums during day and night, and the images may consist of different perspectives and lighting conditions. Accordingly, the data set may include 209 training images collected from 10 games and 186 testing images collected from the other 10 games.

At step 404, organization computing system 104 may generate a plurality of camera pose templates from the one or more data sets. For example, based on the retrieved one or more data sets for training, camera calibrator 120 may generate camera pose templates for training. In some embodiments, camera calibrator 120 may generate the camera pose templates using the GMM-based method discussed above, provided that the one or more data sets is adequately large and diverse. In some embodiments, one or more data sets may be considered adequately large and diverse when a complete and relatively clean overhead playing surface image is achieved. In such embodiments, camera calibrator 120 may set the standard deviation for pan, tilt, focal length, and camera locations (x, y, z). In some embodiments, camera calibrator 120 may further set the threshold for stopping criteria and warping loss, $\mathcal{L}_{warp}\delta$.

Continuing with the first example referenced above, using the basketball data set, camera calibrator 120 may use the GMM-based method to generate camera pose templates from 1052 training images. In such example, camera calibrator 120 may set the standard deviation for pan, tilt, focal length, and camera locations (x, y, z) to 5°, 5°, 1000 pixels, and 15 feet respectively. The non-diagonal elements may be set to zero, as camera calibrator 120 assumes that those camera configurations are independent of each other. The threshold for the stopping criteria may be set to 0.6 and the clustering algorithm may generate 210 components. For the warping loss, $\mathcal{L}_{warp}\delta$ may be set to 0.8 because the camera perspective may have a lower field occupancy rate than the top view perspective.

In some embodiments, camera calibrator 120 may generate the camera pose templates using a high grid resolution if, for example, the one or more data sets has an insufficient number of examples. In such embodiments, camera calibrator 120 may set the resolution of pan, tilt, and focal length.

Continuing with the second example referenced above, using the soccer data set, camera calibrator 120 may use a high grid resolution approach to generate the camera pose templates. In such examples, camera calibrator 120 may set the resolution of pan, tilt, and focal length to 5°, 2.5°, and 500 pixels, respectively. In some embodiments, the camera locations may be fixed at, for example, 560, 1150, and 186, yards relative to the top left corner of the field. Because the soccer data set has an insufficient number of examples to use the GMM-based camera pose estimation, camera calibrator 120 may use a uniform sampling for this data set with estimated pan, tilt, and focal length range ([−35°, 35°], [5°, 15°], [1500, 4500] pixels respectively), which generates 450 templates for camera pose initialization.

As those skilled in the art recognize, although basketball and soccer are discussed in the current examples, such methodologies may be extended to the video broadcast of any sport.

At step 406, organization computing system 104 may learn, based on the one or more training data sets, how to calibrate a single moving camera. For example, neural network of camera calibrator 120 may learn how to calibrate a single moving camera based on the one or more training data sets. In some embodiments, each module of neural network architecture 200 may be trained simultaneously. For example, because each module 202-206 of neural network architecture 200 uses the output of other modules as input, the three modules 202-206 may be connected into a single neural network. As such, the total loss of the network may become:

$$\mathcal{L} = \alpha \mathcal{L}_{ce} + \mathcal{L}_{con} + (1-\alpha-\beta)\mathcal{L}_{warp}$$

where $\alpha$, $\beta \in [0,1)$.

Camera calibrator 120 may train the entire neural network architecture 200 incrementally, module-by-module, so that the Siamese network and STN may start training with reasonable inputs. For example, training may start with a 20-epoch warm-up for the Unet; the Siamese network training may be turned on with a $\alpha$=0.1 and $\beta$=0.9. After another 10 epochs, for example, the STN may be turned on with $\alpha$=0.05 and $\beta$=0.05. Neural network architecture may continue to undergo join training until convergence.

In some embodiments, one or more modules of modules 202-206 may be "warmed up" with synthesized data. For example, due to the small number of training examples in the above referenced soccer data sets, camera calibrator 120 may use synthesized data to warm up camera pose initialization module 204 and homography refinement module 206. Apart from Unet in semantic segmentation module 202, the rest of neural network architecture 200 uses the semantic images as input so that camera calibrator 120 can synthesize an arbitrary number of semantic images to pre-train parts of the network. Using a specific example, 2000 semantic images may be generated by uniformly sampling the pan, tilt, and focal length parameters. For each synthesized image, their ground truth homography is known, and the template assignment can be easily found by down sampling the grid. Thus, camera pose initialization module 204 and the STN may be pre-trained individually. Once camera pose initialization module 204 and homography refinement module 206 are warmed up, camera calibrator 120 may train neural network with real data.

At step 408, organization computing system 104 may output a fully trained prediction model. For example, at the end of the training and testing processes, camera calibrator 120 may have a fully trained neural network architecture 200.

Figure 5:
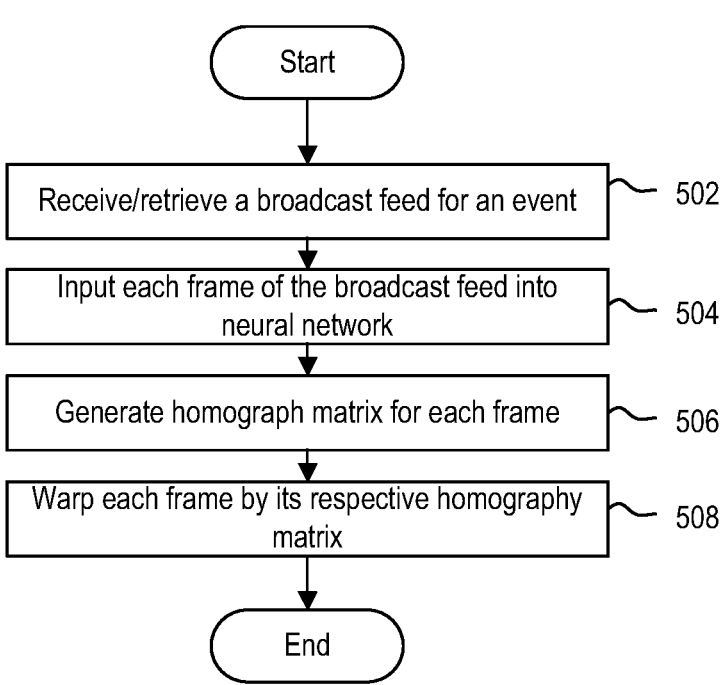
FIG. 5 is a flow diagram illustrating a method of calibrating a broadcast camera, according to example embodiments.

FIG. 5 is a flow diagram illustrating a method 500 of calibrating a broadcast camera, according to example embodiments. Method 500 may begin at step 502.

At step 502, organization computing system 104 may receive (or retrieve) a broadcast feed for an event. In some embodiments, the broadcast feed may be a live feed received in real-time (or near real-time) from camera system 102. In some embodiments, the broadcast feed may be a broadcast feed of a game that has concluded. Generally, the broadcast feed may include a plurality of frames of video data. Each frame may capture a different camera perspective.

At step 504, organization computing system 104 may input each frame into neural network architecture 200. For example, camera calibrator 120 may identify a first frame in a received broadcast feed and provide that frame to neural network architecture 200.

At step 506, organization computing system 104 may generate a homography matrix H for each frame. For example, semantic segmentation module 202 may identify the court features Y in each frame. The output from semantic segmentation module 202 may be the semantic map $\overline{Y}$ generated by the Unet. The semantic map $\overline{Y}$ may be provided as input to camera pose initialization module 204. Camera pose initialization module 204 may select the appropriate template $T_{\overline{k}}$ from a set of templates using semantic map $\overline{Y}$. Camera pose initialization module 204 may further identify the target camera pose index $\overline{k}$ and retrieve its template image $T_{\overline{k}}$ and homography $H_{\overline{k}}^*$ using selection module 210. Camera calibrator 120 may pass, as input to homography refinement module 206, both $T_{\overline{k}}$ and $\overline{Y}$ concatenated and H. Homography refinement module 206 may then predict the relative homography $\overline{H}$ between the template and the semantic map by passing the concatenated item $T_{\overline{k}}$ and $\overline{Y}$ to the STN. Homography refinement module 206 may then generate the homography matrix H based on the relative homography $\overline{H}$ and $H_{\overline{k}}$ using matrix multiplication, i.e., $H=\overline{H}H_{\overline{k}*}$.

At step 508, organization computing system 104 may warp each frame by its respective homography matrix H.

Figures 6A, 6B:
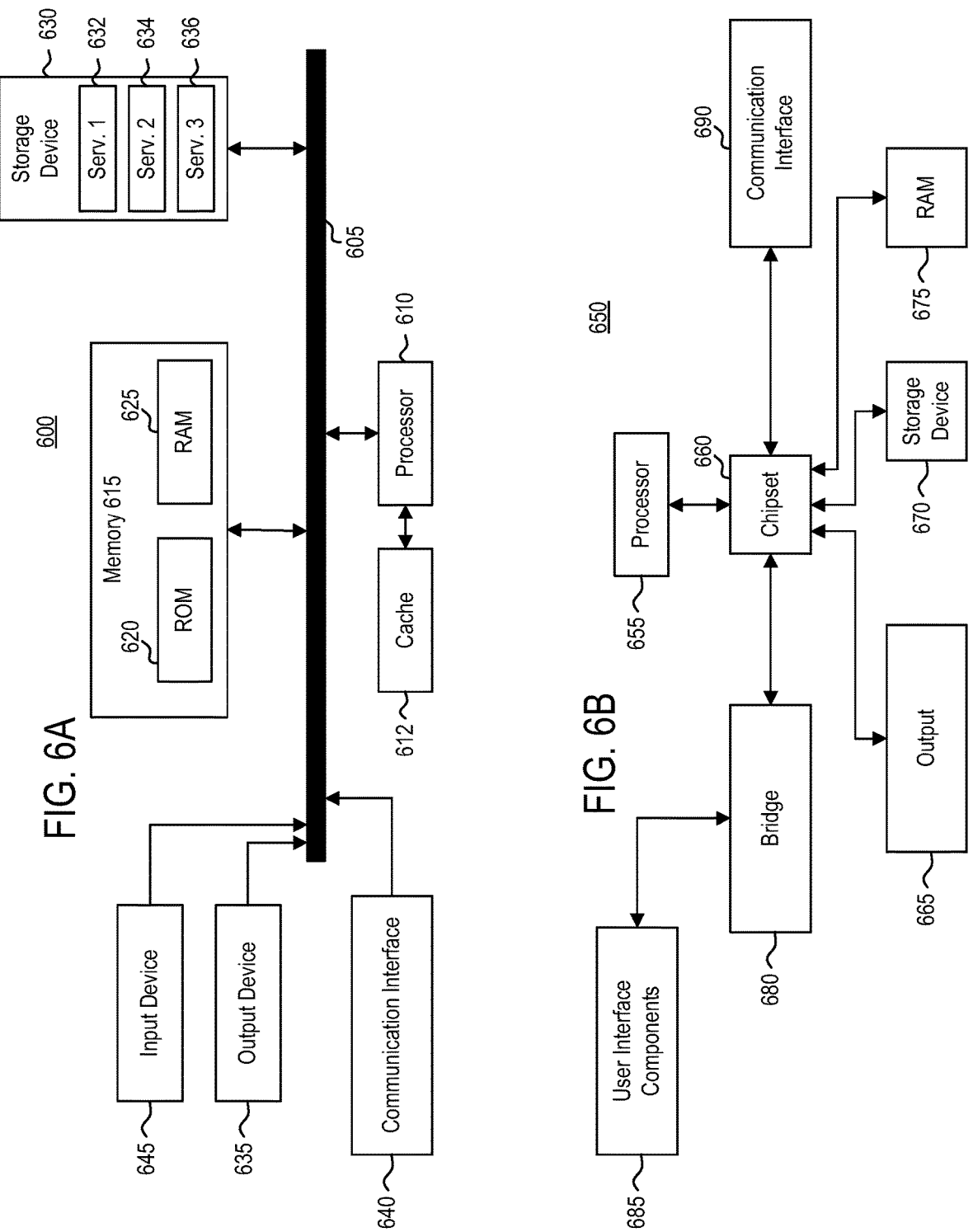
FIG. 6A is a block diagram illustrating a computing device, according to example embodiments.
FIG. 6B is a block diagram illustrating a computing device, according to example embodiments.

FIG. 6A illustrates a system bus computing system architecture 600, according to example embodiments. System 600 may be representative of at least a portion of organization computing system 104. One or more components of system 600 may be in electrical communication with each other using a bus 605. System 600 may include a processing unit (CPU or processor) 610 and a system bus 605 that couples various system components including the system memory 615, such as read only memory (ROM) 620 and random access memory (RAM) 625, to processor 610. System 600 may include a cache of high-speed memory connected directly with, in close proximity to, or integrated as part of processor 610. System 600 may copy data from memory 615 and/or storage device 630 to cache 612 for quick access by processor 610. In this way, cache 612 may provide a performance boost that avoids processor 610 delays while waiting for data. These and other modules may control or be configured to control processor 610 to perform various actions. Other system memory 615 may be available for use as well. Memory 615 may include multiple different types of memory with different performance characteristics. Processor 610 may include any general purpose processor and a hardware module or software module, such as service 1 632, service 2 634, and service 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing device 600, an input device 645 may represent any number of input mechanisms, such as a microphone for speech, a touch-sensitive screen for gesture or graphical input, keyboard, mouse, motion input, speech and so forth. An output device 635 may also be one or more of a number of output mechanisms known to those of skill in the art. In some instances, multimodal systems may enable a user to provide multiple types of input to communicate with computing device 600. Communications interface 640 may generally govern and manage the user input and system output. There is no restriction on operating on any particular hardware arrangement and therefore the basic features here may easily be substituted for improved hardware or firmware arrangements as they are developed.

Storage device 630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 may include services 632, 634, and 636 for controlling the processor 610. Other hardware or software modules are contemplated. Storage device 630 may be connected to system bus 605. In one aspect, a hardware module that performs a particular function may include the software component stored in a computer-readable medium in connection with the necessary hardware components, such as processor 610, bus 605, display 635, and so forth, to carry out the function.

FIG. 6B illustrates a computer system 650 having a chipset architecture that may represent at least a portion of organization computing system 104. Computer system 650 may be an example of computer hardware, software, and firmware that may be used to implement the disclosed technology. System 650 may include a processor 655, representative of any number of physically and/or logically distinct resources capable of executing software, firmware, and hardware configured to perform identified computations. Processor 655 may communicate with a chipset 660 that may control input to and output from processor 655. In this example, chipset 660 outputs information to output 665, such as a display, and may read and write information to storage device 670, which may include magnetic media, and solid state media, for example. Chipset 660 may also read data from and write data to RAM 675. A bridge 680 for interfacing with a variety of user interface components 685 may be provided for interfacing with chipset 660. Such user interface components 685 may include a keyboard, a microphone, touch detection and processing circuitry, a pointing device, such as a mouse, and so on. In general, inputs to system 650 may come from any of a variety of sources, machine generated and/or human generated.

Chipset 660 may also interface with one or more communication interfaces 690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 655 analyzing data stored in storage 670 or 675. Further, the machine may receive inputs from a user through user interface components 685 and execute appropriate functions, such as browsing functions by interpreting these inputs using processor 655.

It may be appreciated that example systems 600 and 650 may have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method of calibrating a broadcast video feed, comprising:

receiving, by a computing system, a broadcast video feed for a sporting event, the broadcast video feed including a plurality of frames;

inputting, by the computing system, the plurality of frames into a trained neural network, wherein the trained neural network is configured to generate a corresponding homography matrix for each of the plurality of frames;

calibrating, by the computing system, the broadcast video feed, wherein calibrating the broadcast video feed includes:

warping each of the plurality of frames based on the corresponding homography matrix to a high occupancy perspective and a low occupancy perspective, wherein warping each of the plurality of frames includes generating one or more images and one or more semantic labels; and computing a loss function between the plurality of warped frames, wherein computing the loss function includes weighting the plurality of warped frames according to the high occupancy perspective and the low occupancy perspective; and utilizing, by the computing system, the one or more images, the one or more semantic labels, and the loss function to further train the trained neural network.

2. The method of claim 1, wherein the trained neural network comprises:

a semantic segmentation module;

a camera pose initialization module; and a homography refinement module.

3. The method of claim 2, wherein the semantic segmentation module is configured to generate a semantic map.

4. The method of claim 3, wherein the camera pose initialization module is configured to select a template from a set of templates using the semantic map to generate the homography matrix.

5. The method of claim 4, wherein the homography refinement module is configured to generate the homography matrix based on the template and the semantic map.

6. The method of claim 4, wherein the camera pose initialization module utilizes a Siamese network to select the template from the set of templates.

7. The method of claim 1, wherein the homography matrix registers a target ground-plane surface of any of the plurality of frames with a top view field model.

8. The method of claim 1, wherein the broadcast video includes an overhead view model, and wherein the overhead view model includes projected one or more three-dimensional locations of at least one of: one or more players or a ball onto a two-dimensional overhead view of a court of the sporting event.

9. The method of claim 8, wherein the warping each of the plurality of frames includes warping the overhead view model with the homography matrix.

10. A system for calibrating a broadcast video feed, comprising:

a processor; and a memory having programming instructions stored thereon, which, when executed by the processor, performs one or more operations, comprising:

receiving a broadcast video feed for a sporting event, the broadcast video feed including a plurality of frames;

inputting the plurality of frames into a trained neural network, wherein the trained neural network is configured to generate a corresponding homography matrix for each of the plurality of frames;

calibrating the broadcast video feed, wherein calibrating the broadcast video feed includes:

warping each of the plurality of frames based on the corresponding homography matrix to a high occupancy perspective and a low occupancy perspective, wherein warping each of the plurality of frames includes generating one or more images and one or more semantic labels; and computing a loss function between the plurality of warped frames, wherein computing the loss function includes weighting the plurality of warped frames according to the high occupancy perspective and the low occupancy perspective; and utilizing the one or more images, the one or more semantic labels, and the loss function to further train the trained neural network.

11. The system of claim 10, wherein the trained neural network comprises:

a semantic segmentation module;

a camera pose initialization module; and a homography refinement module.

12. The system of claim 11, wherein the semantic segmentation module is configured to generate a semantic map.

13. The system of claim 12, wherein the camera pose initialization module is configured to select a template from a set of templates using the semantic map to generate the homography matrix.

14. The system of claim 13, wherein the camera pose initialization module utilizes a Siamese network to select the template from the set of templates.

15. The system of claim 10, wherein the homography matrix registers a target ground-plane surface of any of the plurality of frames with a top view field model.

16. The system of claim 10, wherein the broadcast video includes an overhead view model, and wherein the overhead view model includes projected one or more three-dimensional locations of at least one of: one or more players or a ball onto a two-dimensional overhead view of a court of the sporting event.

17. The system of claim 16, wherein the warping each of the plurality of frames includes warping the overhead view model with the homography matrix.

18. A non-transitory computer readable medium including one or more sequences of instructions that, when executed by one or more processors, causes:

receiving, by a computing system, a broadcast video feed for a sporting event, the broadcast video feed including a plurality of frames;

inputting, by the computing system, the plurality of frames into a trained neural network, wherein the trained neural network is configured to generate a corresponding homography matrix for each of the plurality of frames;

calibrating, by the computing system, the broadcast video feed, wherein calibrating the broadcast video feed includes:

warping each of the plurality of frames based on the corresponding homography matrix to a high occupancy perspective and a low occupancy perspective, wherein warping each of the plurality of frames includes generating one or more images and one or more semantic labels; and computing a loss function between the plurality of warped frames, wherein computing the loss function includes weighting the plurality of warped frames according to the high occupancy perspective and the low occupancy perspective; and utilizing, by the computing system, the one or more images, the one or more semantic labels, and the loss function to further train the trained neural network.

19. The non-transitory computer readable medium of claim 18, wherein the homography matrix registers a target ground-plane surface of any of the plurality of frames with a top view field model.

20. The non-transitory computer readable medium of claim 18, wherein the broadcast video includes an overhead view model, and wherein the overhead view model includes projected one or more three-dimensional locations of at least one of: one or more players or a ball onto a two-dimensional overhead view of a court of the sporting event.

* * * * *